United States Patent
Zheng (10) Patent No.: US 12,527,589 B2
(45) Date of Patent: Jan. 20, 2026

(54) ULTRASONIC PROBE ASSEMBLY AND SYSTEM

(71) Applicant: Bard Peripheral Vascular, Inc., Franklin Lakes, NJ (US)

(72) Inventor: Peng Zheng, Chandler, AZ (US)

(73) Assignee: BARD PERIPHERAL VASCULAR, INC., Franklin Lakes, NJ (US)

( * ) Notice: Subject to any disclaimer, the term of this patent is extended or adjusted under 35 U.S.C. 154(b) by 880 days.

(21) Appl. No.: 17/778,278

(22) PCT Filed: Nov. 26, 2019

(86) PCT No.: PCT/US2019/063254
§ 371 (c)(1),
(2) Date: May 19, 2022

(87) PCT Pub. No.: WO2021/107927
PCT Pub. Date: Jun. 3, 2021

(65) Prior Publication Data
US 2022/0387054 A1    Dec. 8, 2022

(51) Int. Cl.
*A61B 17/22*  (2006.01)
*A61B 17/32*  (2006.01)

(52) U.S. Cl.
CPC ........... *A61B 17/22004* (2013.01); *A61B 17/320068* (2013.01); *A61B 2017/22014* (2013.01)

(58) Field of Classification Search
CPC ...... A61B 17/22004; A61B 17/320068; A61B 2017/22014; A61B 2017/320069;
(Continued)

(56) References Cited

U.S. PATENT DOCUMENTS

| 4,854,325 A | 8/1989 | Stevens |
| 5,209,719 A | 5/1993 | Baruch et al. |

(Continued)

FOREIGN PATENT DOCUMENTS

| CN | 102573983 A | 7/2012 |
| CN | 104640512 B | 5/2015 |

(Continued)

OTHER PUBLICATIONS

Japanese Office Action dated Sep. 5, 2023 pertaining to Japanese application No. 2022-530774 filed May 25, 2022, pp. 1-13.
(Continued)

*Primary Examiner* — Jing Rui Ou
(74) *Attorney, Agent, or Firm* — DINSMORE & SHOHL LLP (57) ABSTRACT

An ultrasonic probe assembly includes a handle configured to be handheld, and has a housing that defines a chamber. A carriage is slidably coupled to the housing. The carriage has an operator arm configured to be operable by a user to move the carriage between a first position and a second position. An ultrasonic catheter has a catheter sheath and an ultrasonic core wire. The ultrasonic catheter has a proximal end portion and a distal end portion. An ultrasonic transducer is positioned in the chamber of the housing. The ultrasonic transducer is connected to the proximal end portion of the ultrasonic catheter, and the ultrasonic transducer is connected to the carriage. The ultrasonic transducer is configured to longitudinally move in the chamber of the housing between a retracted position and an extended position coincident with a corresponding longitudinal movement of the carriage.

16 Claims, 3 Drawing Sheets

(58) Field of Classification Search
CPC .................... A61B 17/22; A61B 17/32; A61B 2017/22074; A61B 17/22012
See application file for complete search history.

(56) References Cited

U.S. PATENT DOCUMENTS

| | | | |
|---|---|---|---|
| 5,243,997 | A | 9/1993 | Uflacker et al. |
| 5,383,460 | A * | 1/1995 | Jang ............... A61B 17/320783 |
| | | | 600/463 |
| 5,643,298 | A | 7/1997 | Nordgren et al. |
| 6,387,109 | B1 * | 5/2002 | Davison ......... A61B 17/320068 |
| | | | 606/169 |
| 7,717,865 | B2 | 5/2010 | Boutillette et al. |
| 8,313,493 | B2 | 11/2012 | Fischer |
| 8,435,228 | B2 | 5/2013 | Wulfman et al. |
| 8,700,130 | B2 | 4/2014 | Iddan et al. |
| 9,050,126 | B2 | 6/2015 | Rivers et al. |
| 9,375,553 | B2 | 6/2016 | Chrisman |
| 9,439,674 | B2 | 9/2016 | Rydberg et al. |
| 9,603,615 | B2 | 3/2017 | Sarge |
| 10,335,187 | B2 | 7/2019 | Benjamin et al. |
| 10,368,902 | B2 | 8/2019 | Kessler et al. |
| 2004/0204670 | A1 * | 10/2004 | Nita ................. A61B 17/22012 |
| | | | 606/159 |
| 2004/0210140 | A1 * | 10/2004 | Rabiner ........... A61B 17/22012 |
| | | | 600/459 |
| 2005/0187513 | A1 * | 8/2005 | Rabiner ........... A61B 17/22012 |
| | | | 604/22 |
| 2009/0264770 | A1 * | 10/2009 | Liu .................. A61B 17/22012 |
| | | | 600/466 |
| 2011/0105960 | A1 * | 5/2011 | Wallace ........... A61B 17/22012 |
| | | | 601/2 |
| 2015/0045806 | A1 | 2/2015 | Urich et al. |
| 2018/0110532 | A1 | 4/2018 | Gast |
| 2018/0140321 | A1 | 5/2018 | Deepa |
| 2018/0161550 | A1 | 6/2018 | Pillai et al. |
| 2018/0214675 | A1 | 8/2018 | Shekalim et al. |
| 2019/0159792 | A1 * | 5/2019 | Panian ................ A61M 25/104 |

FOREIGN PATENT DOCUMENTS

| | | |
|---|---|---|
| CN | 105050660 B | 11/2015 |
| CN | 207950348 U | 10/2018 |
| CN | 109937017 A | 6/2019 |
| JP | 04030508 U | 3/1992 |
| WO | 2016081026 A1 | 5/2016 |
| WO | 2018097856 A1 | 5/2018 |

OTHER PUBLICATIONS

International Search Report and Written Opinion dated Jul. 24, 2020, in International Application No. PCT/US2019/063254.

Chinese Office Action for Appln. No. 201980102562.8, mailed Mar. 38, 2025, 19 pages.

Chinese Office Action for Appln. No. 201980102562.8, mailed Sep. 9, 2024, 22 pages.

\* cited by examiner

ULTRASONIC PROBE ASSEMBLY AND SYSTEM

CROSS-REFERENCE TO RELATED APPLICATIONS

This application is a U.S. National Phase of International Application No. PCT/US2019/063254, entitled "ULTRASONIC PROBE ASSEMBLY AND SYSTEM" and filed Nov. 26, 2019, which is incorporated herein by reference in its entirety.

TECHNICAL FIELD

The present invention relates to an ultrasonic system, and more particularly, to an ultrasonic probe assembly and system that may be used for occlusion engagement during crossing and atherectomy procedures.

BACKGROUND ART

Vascular procedures, such as a crossing procedure or an atherectomy procedure, may be used to restore patency and blood flow that was lost due to one or more intravascular occlusions. A crossing procedure is a procedure in which an opening is formed through the intravascular occlusion. An atherectomy procedure may include crossing, but also attempts to break up and remove the intravascular occlusion. An ultrasonic system having an ultrasonic catheter may be used in performing crossing and atherectomy procedures.

The intravascular occlusion may be in the form of a calcified vascular occlusion having hard proximal and distal end caps. During an ultrasonic crossing or atherectomy procedure, a distal tip of the ultrasonic catheter engages the proximal end cap of the calcified vascular occlusion. However, because of the hardness of the proximal end cap of the calcified vascular occlusion, the distal tip of the ultrasonic catheter may unintentionally bounce off of the proximal end cap and take a sub-intimal migration path into the side wall of the vasculature.

What is needed in the art is an ultrasonic probe assembly and system that can effectively operate in each of a crossing procedure and an atherectomy procedure.

SUMMARY OF INVENTION

The present invention provides an ultrasonic probe assembly and system that can effectively operate in each of a crossing procedure and an atherectomy procedure.

The invention is directed to an ultrasonic probe assembly, and system, that includes a handle configured to be handheld. The handle includes a housing that defines a chamber. A carriage is slidably coupled to the housing in the chamber. The carriage is configured to longitudinally move along the housing between a first position and a second position. The carriage has an operator arm configured to be operable by a user to move the carriage between the first position and the second position. An ultrasonic catheter has a catheter sheath and an ultrasonic core wire. The ultrasonic catheter has a proximal end portion and a distal end portion. An ultrasonic transducer is positioned in the chamber of the housing. The ultrasonic transducer is connected to the proximal end portion of the ultrasonic catheter, and the ultrasonic transducer is connected to the carriage. The ultrasonic transducer is configured to longitudinally move in the chamber of the housing between a retracted position and an extended position coincident with a corresponding longitudinal movement of the carriage.

The ultrasonic catheter may be selectively operable in each of a crossing mode and an atherectomy mode. In some embodiments, the system may further include a control mechanism configured such that, in the crossing mode, the control mechanism facilitates operation of the ultrasonic transducer when the ultrasonic transducer is moved in either of a proximal direction or a distal direction between the retracted position and the extended position, and in the atherectomy mode, the control mechanism is configured to restrict operation of the ultrasonic transducer if the ultrasonic transducer is moved in the distal direction toward the extended position.

An advantage of the present invention is that the engagement end of the ultrasonic catheter may be moved fore and aft by movement of the carriage and transducer while the handle of the ultrasonic probe assembly is stationary relative to the patient, thereby providing more user control over the advancement and retraction of the engagement end of the ultrasonic catheter during a procedure.

Another advantage of the present invention is that the crossing mode and the atherectomy mode may be functionally separate and distinct, based on a position of the carriage and transducer within the housing of the ultrasonic probe assembly.

BRIEF DESCRIPTION OF DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrate at least one embodiment of the invention, and such exemplifications are not to be construed as limiting the scope of the invention in any manner.

DESCRIPTION OF EMBODIMENTS

Figure 1:
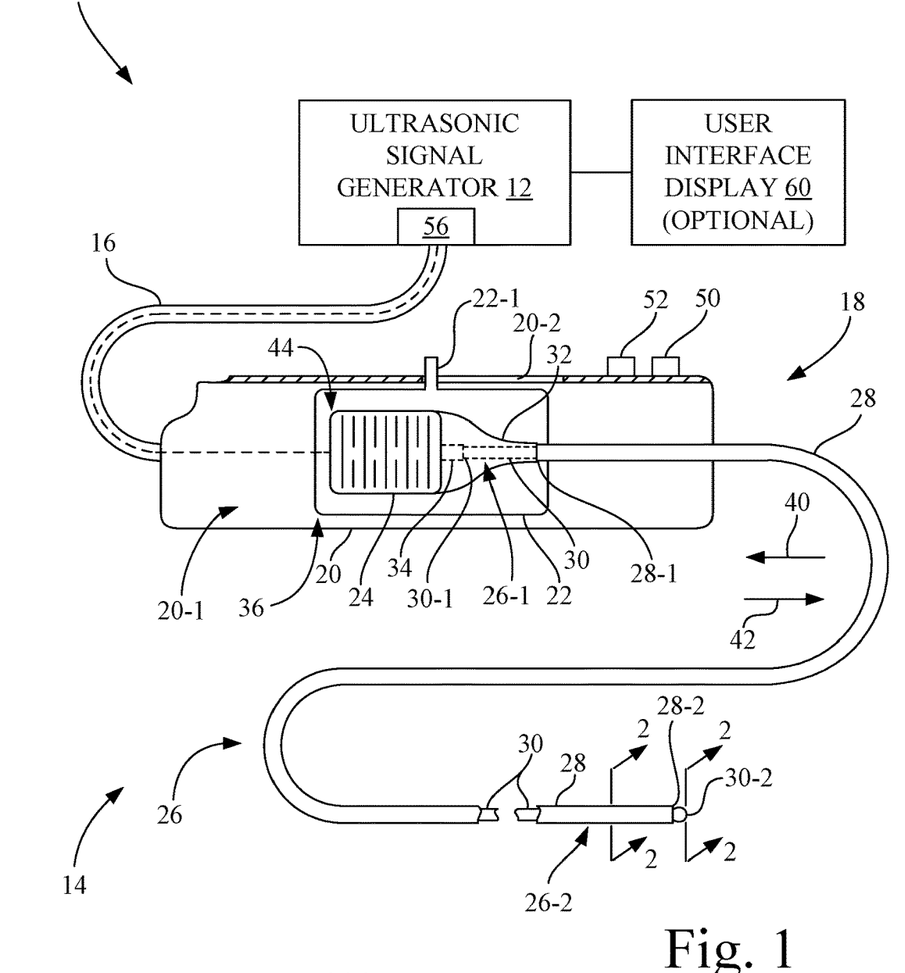
FIG. 1 is a diagrammatic illustration of an ultrasonic system of the present invention, with a slidable carriage and transducer of the ultrasonic probe assembly positioned in a retracted position.

Referring now to the drawings, and more particularly to FIG. 1, there is shown an ultrasonic system 10 in accordance with an embodiment of the present invention. Ultrasonic system 10 is selectively operable in each of a crossing mode and an atherectomy mode.

Ultrasonic system 10 includes an ultrasonic signal generator 12 and an ultrasonic probe assembly 14. Ultrasonic signal generator 12 is communicatively coupled to ultrasonic probe assembly 14 via a multi-conductor cable 16. Ultrasonic signal generator 12 is configured, as is known in the art, to generate electrical excitation signals for delivery via multi-conductor cable 16 to ultrasonic probe assembly 14. The electrical excitation signals may have an excitation frequency, for example, in a frequency range of 20 kilohertz (kHz) to 40 kHz.

In the present embodiment, ultrasonic signal generator 12 is configured to generate an electrical excitation signal, e.g., at 20 kHz, having a first output power when operating a crossing mode, and having a second output power when operating in an atherectomy mode, wherein the second output power is greater than the first output power. Ultrasonic signal generator 12 selectively supplies the electrical excitation signal, e.g., at one of the first output power and the second output power, to ultrasonic probe assembly 14 to operate the ultrasonic probe assembly 14 in a selected one of the crossing mode and the atherectomy mode. Variation of the output power of the electrical excitation signal may be effected by varying one or more of the output current, voltage, duty cycle, waveform, and/or frequency of the electrical excitation signal.

Ultrasonic probe assembly 14 includes a handle 18 configured to be handheld by a user. Handle 18 includes a housing 20 that defines a chamber 20-1. Ultrasonic probe assembly 14 further includes a carriage 22, an ultrasonic transducer 24, and an ultrasonic catheter 26.

Ultrasonic catheter 26 includes catheter sheath 28 and an ultrasonic core wire 30. Ultrasonic catheter 26 has a proximal end portion 26-1 and a distal end portion 26-2. Catheter sheath 28 has a proximal sheath end 28-1 and a distal sheath end 28-2. Proximal sheath end 28-1 may be connected, for example, to the housing structure of ultrasonic transducer 24.

Figure 2:
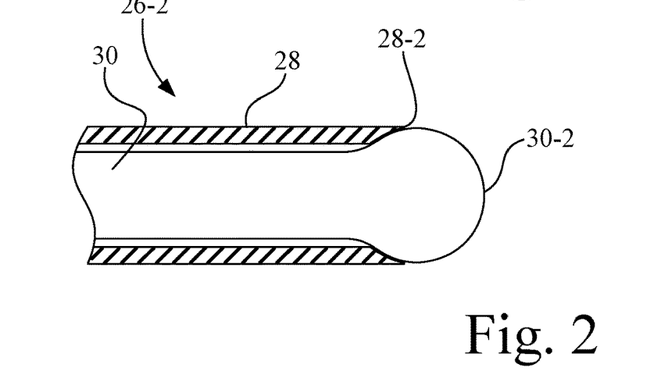
FIG. 2 is a section view of a distal portion of the ultrasonic catheter of FIG. 1, taken along line 2-2 of FIG. 1.

Referring to FIGS. 1 and 2, ultrasonic core wire 30 has a proximal end 30-1 and an engagement end 30-2. Ultrasonic core wire 30 is an elongate flexible metal wire, e.g., nitinol, which is located in, and longitudinally extends within, catheter sheath 28. In the present embodiment, ultrasonic core wire 30 may have a length greater than 60 centimeters (cm), and in some embodiments, a length of 100 to 200 cm. Proximal end 30-1 of ultrasonic core wire 30 is operably connected to ultrasonic transducer 24, e.g., by an acoustic horn 32 and/or sonic connector 34, to receive the vibrational energy from ultrasonic transducer 24 so as to produce a vibrational motion of ultrasonic core wire 30. The vibrational motion of ultrasonic core wire 30 may be longitudinal or a combination of longitudinal and transverse vibration, depending upon a mode of operation.

Ultrasonic transducer 24 is selectively operable in each of the crossing mode and the atherectomy mode, based on the power level of the electrical excitation signal generated by ultrasonic signal generator 12 and supplied to ultrasonic transducer 24 via multi-conductor cable 16. In the present embodiment, ultrasonic signal generator 12 is configured to selectively supply one of the first electrical excitation signal and the second electrical excitation signal to ultrasonic transducer 24. In the crossing mode, the electrical excitation signal supplied by ultrasonic signal generator 12 is at the first output power, and in turn, ultrasonic transducer 24 supplies vibratory energy to ultrasonic core wire 30 at a first ultrasonic energy level, resulting in substantially only longitudinal vibrational motion of ultrasonic core wire 30. In the atherectomy mode, the electrical excitation signal supplied by ultrasonic signal generator 12 is at the second output power, and in turn, ultrasonic transducer 24 supplies vibratory energy to the ultrasonic core wire 30 at a second ultrasonic energy level greater than the first ultrasonic energy level, resulting in transverse vibrational motion and longitudinal vibrational motion of ultrasonic core wire 30.

Figure 3:
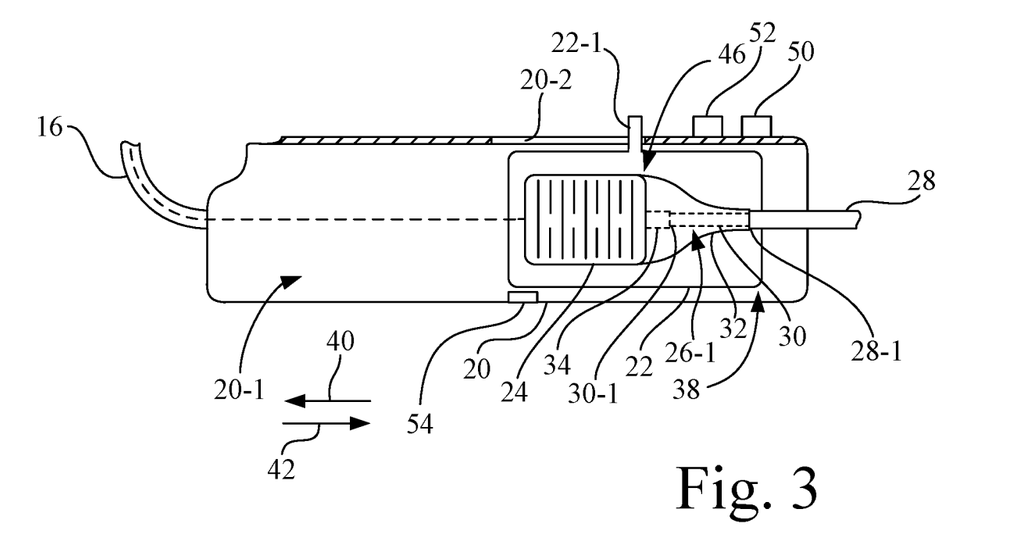
FIG. 3 is a diagrammatic illustration of a portion of the ultrasonic system of FIG. 1, with the slidable carriage and transducer of the ultrasonic probe assembly positioned in an extended position.

Referring to FIGS. 1 and 3, carriage 22 is slidably coupled to housing 20, e.g., by a linear guideway arrangement, such as a rail guideway or channel guideway formed in housing 20, to receive corresponding slidable elements (e.g., pins or rollers) of carriage 22. Carriage 22 is configured to longitudinally move along housing 20 in chamber 20-1 between a first position 36 and a second position 38, in either of a proximal direction 40 or a distal direction 42. Carriage 22 has an operator arm 22-1 configured to be operable by a user to move carriage 22 between the first position 36 and the second position 38. More particularly, operator arm 22-1 may protrude through a slot 20-2 in housing 20, such that a portion of operator arm 22-1 is exposed external to handle 18.

Ultrasonic transducer 24 is positioned in chamber 20-1 of housing 20, and is connected to carriage 22, such that carriage 22 and ultrasonic transducer 24 are longitudinally movable in unison in chamber 20-1 of housing 20. Stated differently, ultrasonic transducer 24 is configured to longitudinally move in chamber 20-1, relative to housing 20, between a retracted position 44 (FIG. 1) and an extended position 46 (FIG. 3) coincident with a corresponding longitudinal movement of carriage 22. As such, slack is provided in multi-conductor cable 16 within housing 20 to accommodate the movement of carriage 22 and ultrasonic transducer 24. It is noted that retracted position 44 of ultrasonic transducer 24 corresponds with first position 36 of carriage 22, and extended position 46 of ultrasonic transducer 24 corresponds to second position 38 of carriage 22.

Since ultrasonic transducer 24 is connected to the proximal end portion 26-1 of the ultrasonic catheter 26, then ultrasonic catheter 26 moves coincident with a longitudinal movement of the ultrasonic transducer 24. Stated differently, in accordance with an aspect of the invention, the combination of carriage 22, ultrasonic transducer 24, and ultrasonic catheter 26 are longitudinally movable relative to housing 20 of handle 18 by a longitudinal displacement of operator arm 22-1 relative to housing 20.

In operation, operator arm 22-1 of carriage 22 may be slidably operated, e.g., by the thumb or forefinger of the user, to move carriage 22 and ultrasonic transducer 24 within chamber 20-1 of housing 20 of ultrasonic probe assembly 14. This movement of carriage 22 and ultrasonic transducer 24 translates into a corresponding movement of engagement end 30-2 of ultrasonic core wire 30 of ultrasonic catheter 26. As such, catheter sheath 28 and engagement end 30-2 of ultrasonic core wire 30 of ultrasonic catheter 26 may be moved fore and aft by movement of carriage 22 and ultrasonic transducer 24 while handle 18 of ultrasonic probe assembly 14 is stationary relative to the patient, thereby providing more user control over the advancement and retraction of the engagement end 30-2 of ultrasonic core wire 30 of ultrasonic catheter 26 during a procedure.

Figure 4:
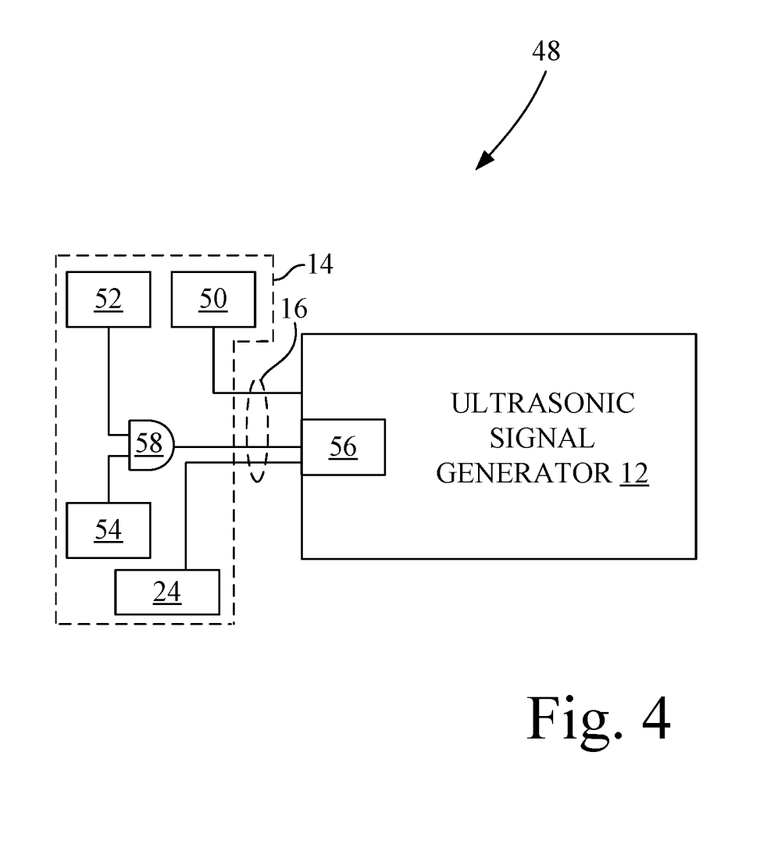
FIG. 4 is a block diagram of a control mechanism for the ultrasonic system of FIGS. 1 and 3.

Referring to FIG. 4, ultrasonic probe assembly 14 further, in whole or in part, includes a control mechanism 48, e.g., a control circuit, that is configured to control the operation of the ultrasonic transducer 24 depending upon a position, e.g., a direction of movement, of carriage 22 and ultrasonic transducer 24 in each of the crossing mode and the atherectomy mode. More particularly, in the crossing mode, control mechanism 48 facilitates operation of ultrasonic transducer 24, and in turn ultrasonic catheter 26, when ultrasonic transducer 24 is moved in either of the proximal direction 40 or the distal direction 42, between the retracted position 44 and the extended position 46. Also, in the atherectomy mode, control mechanism 48 is configured to restrict operation of ultrasonic transducer 24 if movement of ultrasonic transducer 24 (and carriage 22) is attempted in the distal direction 42 toward the extended position 46.

For example, to restrict operation of ultrasonic transducer 24, an electrical solution may be, for example, to reduce or cut off electrical power to ultrasonic transducer 24 if movement is attempted in the distal direction 42 while in the atherectomy mode. Alternatively, a mechanical solution to restrict operation of ultrasonic transducer 24 in the atherectomy mode may be to provide a mechanical block in housing 20 that only allows one-way movement of carriage 22 and ultrasonic transducer 24 in only the proximal direction 40 while operating in the atherectomy mode.

Referring to FIG. 4 in conjunction with FIGS. 1 and 3, in one embodiment of an electrical solution to restrict operation of ultrasonic transducer 24, control mechanism 48 includes a first button 50, a second button 52, a sensor 54, and a control circuit 56.

First button 50 and second button 52 may be included with, and attached to, housing 20 of ultrasonic probe assembly 14. First button 50 and second button 52 may be, for example, a respective pushbutton, a selector switch, a slider switch, or input icons on ultrasonic probe assembly 14. Alternatively, or supplemental to the above, first button 50 and second button 52 may be incorporated into a user interface display 60 (see FIG. 1) that is separate from, but communicatively coupled to, ultrasonic probe assembly 14.

First button 50 is actuated by the user to select the crossing mode, and second button 52 is actuated by the user to select the atherectomy mode. Ultrasonic signal generator 12 is communicatively coupled to each of first button 50 and second button 52, e.g., via multi-conductor cable 16. Upon actuation of first button 50, ultrasonic signal generator 12 generates the electrical excitation signal having the first output power, associated with the crossing mode. Upon actuation of second button 52, ultrasonic signal generator 12 generates the electrical excitation signal having the second output power, associated with the atherectomy mode.

Sensor 54 is configured to detect a direction of movement of the ultrasonic transducer 24 in the chamber 20-1 of the housing 20. Sensor 54 may be, for example, a proximity sensor or a slide rheostat. More particularly, in the present embodiment, sensor 54 is positioned in housing 20 to detect a direction of movement of carriage 22, and in turn, to detect a direction of movement of ultrasonic transducer 24.

Control circuit 56 is communicatively coupled to sensor 54 and to ultrasonic signal generator 12. Control circuit 56 may be configured to cut off the electrical excitation signal from ultrasonic transducer 24 if the sensor 54 detects movement of the ultrasonic transducer 24 in the distal direction 42 while in the atherectomy mode (second button 52 actuated). In the example of second button 52 control mechanism 48 depicted in FIG. 4, a sensor output of sensor 54 and a button output of second button 52 serve as inputs to an AND gate 58, wherein the output of AND gate 58 is connected to control circuit 56, such as a normally closed switch. Accordingly, if both the second button 52 is actuated and sensor 54 detects movement of the ultrasonic transducer 24 in the distal direction 42, then the output of AND gate 58 changes the operating state of control circuit 56 to an open condition, thereby removing the electrical excitation signal from ultrasonic transducer 24. Alternatively, it is contemplated that AND gate 58 and the normally closed switch of control circuit 56 may be replaced with a NAND gate and a normally closed switch.

In one implementation, control circuit 56 may be configured as a cutoff switch located in ultrasonic signal generator 12, so as to prohibit operation of ultrasonic signal generator 12 in the atherectomy mode (second button 52 actuated) if sensor 54 detects movement of the ultrasonic transducer 24 in the distal direction 42 in chamber 20-1 of housing 20. In an alternative implementation, control circuit 56 may be configured as a cutoff switch located at an electrical input to ultrasonic transducer 24, so as to prohibit operation of ultrasonic transducer 24 in the atherectomy mode (second button 52 actuated) if sensor 54 detects movement of the ultrasonic transducer 24 in the distal direction 42 in chamber 20-1 of housing 20.

Optionally, control circuit 56 may be further configured to send a warning, e.g., posting a message on user interface display 60, that the electrical excitation signal has been cut off the from ultrasonic transducer 24 due to a distal advancement of engagement end 30-2 of ultrasonic catheter 26 during the atherectomy mode, and may further provide instructions for corrective action.

Figure 5:
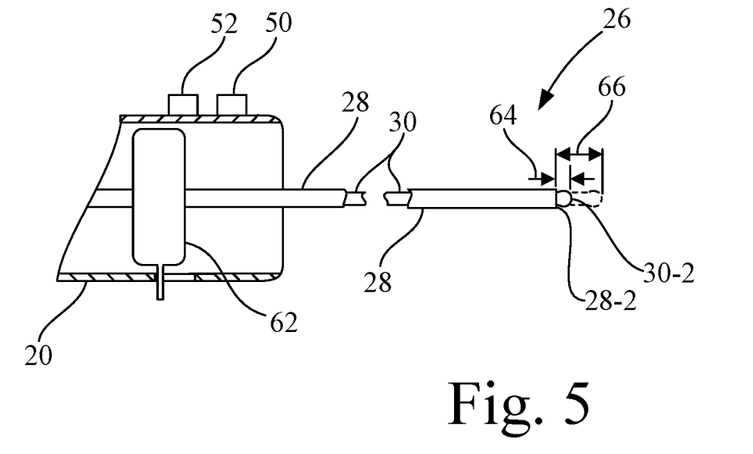
FIG. 5 is a diagrammatic illustration of a catheter slider connected to the catheter sheath so as to move the catheter sheath relative to the ultrasonic core wire of the ultrasonic catheter.

Referring to FIG. 5, as a supplemental feature, it is contemplated that ultrasonic system 10 may include a catheter slider 62 slidably coupled to housing 20. Catheter slider 62 is connected to the catheter sheath 28 so as to move catheter sheath 28 relative to ultrasonic core wire 30. In the crossing mode, catheter slider 62 may be positioned such that engagement end 30-2 of the ultrasonic core wire 30 is at a first distance 64 from the distal sheath end 28-2 of the catheter sheath 28 (e.g., fully retracted). In the atherectomy mode, catheter slider 62 may be positioned such that engagement end 30-2 of the ultrasonic core wire 30 is a second distance 66 from the distal sheath end 28-2 of the catheter sheath 28, e.g., in a fully extended position, so as to expose more of a distal portion of ultrasonic core wire 30.

The following items also relate to the invention:

In one form, the invention relates to an ultrasonic probe assembly for use in an ultrasonic system that may include a handle, a carriage, an ultrasonic catheter, and an ultrasonic transducer. The handle is configured to be handheld, and the handle includes a housing that defines a chamber. The carriage is slidably coupled to the housing in the chamber. The carriage is configured to longitudinally move along the housing between a first position and a second position. The carriage may have an operator arm that is configured to be operable by a user to move the carriage between the first position and the second position. The ultrasonic catheter has a catheter sheath and an ultrasonic core wire. The ultrasonic catheter has a proximal end portion and a distal end portion. The ultrasonic transducer is positioned in the chamber of the housing. The ultrasonic transducer is connected to the proximal end portion of the ultrasonic catheter, and the ultrasonic transducer is connected to the carriage. The ultrasonic transducer is configured to longitudinally move in the chamber of the housing between a retracted position and an extended position coincident with a corresponding longitudinal movement of the carriage.

In accordance with any of the embodiments, the ultrasonic catheter may be configured to move coincident with a longitudinal movement of the ultrasonic transducer.

In some embodiments, the ultrasonic catheter may be selectively operable in each of a crossing mode and an atherectomy mode. Optionally, such embodiments may further comprise a control mechanism configured such that, in the crossing mode, the control mechanism facilitates operation of the ultrasonic transducer when the ultrasonic transducer is moved in either of a proximal direction or a distal direction between the retracted position and the extended position, and in the atherectomy mode, the control mechanism is configured to restrict operation of the ultrasonic transducer if the ultrasonic transducer is moved in the distal direction toward the extended position.

In embodiments that are selectively operable in each of a crossing mode and an atherectomy mode, the ultrasonic transducer/ultrasonic probe assembly may be configured to supply vibratory energy to the ultrasonic core wire at a first ultrasonic energy level in the crossing mode, and to supply vibratory energy to the ultrasonic core wire at a second ultrasonic energy level, greater than the first ultrasonic energy level, in the atherectomy mode.

In the embodiment described in the immediately preceding paragraph, the ultrasonic transducer/ultrasonic probe assembly may be configured such that vibratory energy that is supplied to the ultrasonic core wire at the second ultrasonic energy level may cause both longitudinal and transverse vibrations of the ultrasonic core wire.

In embodiments that include the control mechanism, the control mechanism may include a sensor and a control circuit. The sensor may be located in the housing of the handle. The sensor is configured to detect a direction of movement of the ultrasonic transducer in the chamber of the housing. The control circuit is communicatively coupled to the sensor and the ultrasonic signal generator. The control circuit is configured to prohibit operation of the ultrasonic catheter in the atherectomy mode if the sensor detects movement of the ultrasonic transducer in the distal direction in the chamber of the housing.

In embodiments that include the sensor, optionally, the sensor may be positioned in the housing to detect a direction of movement of the carriage.

In some embodiments, the catheter sheath has a distal sheath end and the ultrasonic core wire has an engagement end, wherein optionally, the engagement end is moveable relative to the distal sheath end.

In the embodiment described in the immediately preceding paragraph, optionally, the ultrasonic probe assembly may further comprise a catheter slider connected to the catheter sheath. The catheter slider may be configured to move the catheter sheath from a home position, wherein the engagement end of the ultrasonic core wire is positioned a first distance from the distal sheath end of the catheter sheath in the crossing mode, and the catheter slider may be configured to position the engagement end of the ultrasonic core wire a second distance from the distal sheath end of the catheter sheath in the atherectomy mode, wherein the second distance is greater than the first distance.

In any of the preceding embodiments, the ultrasonic transducer may be configured to receive an electrical excitation signal from an ultrasonic signal generator.

In another form, the invention relates to an ultrasonic system that may include an ultrasonic signal generator and an ultrasonic probe assembly, optionally the ultrasonic probe assembly of any of the preceding paragraphs [0040] to [0049]. The ultrasonic probe assembly is communicatively coupled to the ultrasonic signal generator. The ultrasonic probe assembly may include a handle, a carriage, an ultrasonic catheter, and an ultrasonic transducer. The handle is configured to be handheld. The handle includes a housing that defines a chamber. The carriage is slidably coupled to the housing in the chamber. The carriage is configured to longitudinally move along the housing between a first position and a second position. The carriage may have an operator arm configured to be operable by a user to move the carriage between the first position and the second position. The ultrasonic catheter has a catheter sheath and an ultrasonic core wire. The ultrasonic catheter has a proximal end portion and a distal end portion. The ultrasonic transducer is positioned in the chamber of the housing. The ultrasonic transducer is connected to the proximal end portion of the ultrasonic catheter, and the ultrasonic transducer is connected to the carriage. The ultrasonic transducer is configured to longitudinally move in the chamber of the housing between a retracted position and an extended position coincident with a corresponding longitudinal movement of the carriage.

In accordance with any of the embodiments, the ultrasonic system may be configured such that the ultrasonic catheter moves coincident with a longitudinal movement of the ultrasonic transducer.

In some embodiments, the ultrasonic system may be selectively operable in each of a crossing mode and an atherectomy mode. In such embodiments, the ultrasonic system may further comprise a control mechanism configured such that, in the crossing mode, the control mechanism facilitates operation of the ultrasonic transducer when the ultrasonic transducer is moved in either of a proximal direction or a distal direction between the retracted position and the extended position, and in the atherectomy mode, the control mechanism is configured to restrict operation of the ultrasonic transducer if the ultrasonic transducer is moved in the distal direction toward the extended position.

In embodiments that are selectively operable in each of a crossing mode and an atherectomy mode, the ultrasonic system may be configured such that, in the crossing mode, the ultrasonic transducer supplies vibratory energy to the ultrasonic core wire at a first ultrasonic energy level, and in the atherectomy mode, the ultrasonic transducer supplies vibratory energy to the ultrasonic core wire at a second ultrasonic energy level greater than the first ultrasonic energy level.

In embodiments that are selectively operable in each of a crossing mode and an atherectomy mode, the handle may include a first button for selecting the crossing mode, and a second button for selecting the atherectomy mode. The ultrasonic signal generator may be communicatively coupled to each of the first button and the second button. The ultrasonic signal generator may be configured to generate an electrical excitation signal that has a first output power when the crossing mode is selected by actuation of the first button, and the electrical excitation signal has a second output power, greater than the first output power, when the atherectomy mode is selected by actuation of the second button. The ultrasonic signal generator is electrically connected to the ultrasonic transducer. The ultrasonic signal generator is configured to selectively supply the electrical excitation signal to the ultrasonic transducer. The control mechanism may include a sensor and a control circuit. The sensor may be located in the housing of the handle, wherein the sensor is configured to detect a direction of movement of the ultrasonic transducer in the chamber of the housing. The control circuit is communicatively coupled to the sensor and the ultrasonic signal generator. The control circuit is configured to prohibit operation of the ultrasonic signal generator in the atherectomy mode if the sensor detects movement of the ultrasonic transducer in the distal direction in the chamber of the housing.

In embodiments that include the control circuit, the control circuit may be optionally configured to cut off the electrical excitation signal from the ultrasonic transducer if the sensor detects movement of the ultrasonic transducer in the distal direction.

In embodiments that include the sensor, optionally, the sensor may be positioned in the housing to detect a direction of movement of the carriage.

In any of the embodiments, the catheter sheath may have a distal sheath end and the ultrasonic core wire may have an engagement end. Optionally, the ultrasonic system may further comprise a catheter slider connected to the catheter sheath, wherein the catheter slider is configured to position the engagement end of the ultrasonic core wire a first distance from the distal sheath end of the catheter sheath in the crossing mode, and the catheter slider is configured to position the engagement end of the ultrasonic core wire a second distance from the distal sheath end of the catheter sheath in the atherectomy mode, wherein the second distance is greater than the first distance.

As used herein, the term "substantially", and any other word of degree, is a relative modifier intended to indicate permissible variation from the characteristic so modified. Such terms are not intended to be limited to the absolute value of the characteristic which it modifies, but rather possessing more of the physical or functional characteristic than the opposite, and approaching or approximating such a physical or functional characteristic.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An ultrasonic probe assembly for use in an ultrasonic system, comprising:
   a handle configured to be handheld, the handle including a housing that defines a chamber;
   a carriage slidably coupled to the housing in the chamber, the carriage configured to longitudinally move along the housing between a first position and a second position, the carriage having an operator arm configured to be operable by a user to move the carriage between the first position and the second position;
   an ultrasonic catheter having a catheter sheath and an ultrasonic core wire, the ultrasonic catheter having a proximal end portion and a distal end portion; and
   an ultrasonic transducer positioned in the chamber of the housing, the ultrasonic transducer being connected to the proximal end portion of the ultrasonic catheter, and the ultrasonic transducer being connected to the carriage, wherein:
   the ultrasonic transducer is configured to longitudinally move in the chamber of the housing between a retracted position and an extended position coincident with a corresponding longitudinal movement of the carriage;
   the ultrasonic catheter is selectively operable in each of a crossing mode and an atherectomy mode;
   the ultrasonic probe assembly further comprises a control mechanism configured such that, in the crossing mode, the control mechanism facilitates operation of the ultrasonic transducer when the ultrasonic transducer is moved in either of a proximal direction or a distal direction between the retracted position and the extended position, and in the atherectomy mode, the control mechanism is configured to restrict operation of the ultrasonic transducer if the ultrasonic transducer is moved in the distal direction toward the extended position; and
   the control mechanism comprises a sensor located in the housing of the handle and a control circuit coupled to the sensor and configured to control the ultrasonic catheter based at least in part on signals received from the sensor.

2. The ultrasonic probe assembly according to claim 1, wherein the ultrasonic catheter moves coincident with a longitudinal movement of the ultrasonic transducer.

3. The ultrasonic probe assembly according to claim 1, wherein the ultrasonic transducer is configured to supply vibratory energy to the ultrasonic core wire at a first ultrasonic energy level in the crossing mode, and to supply vibratory energy to the ultrasonic core wire at a second ultrasonic energy level, greater than the first ultrasonic energy level, in the atherectomy mode.

4. The ultrasonic probe assembly according to claim 3, wherein the vibratory energy supplied to the ultrasonic core wire at the second ultrasonic energy level is configured to cause both longitudinal and transverse vibrations of the ultrasonic core wire.

5. The ultrasonic probe assembly according to claim 1,
   wherein the sensor is configured to detect a direction of movement of the ultrasonic transducer in the chamber of the housing; and
   the control circuit is configured to prohibit operation of the ultrasonic catheter in the atherectomy mode if the sensor detects movement of the ultrasonic transducer in the distal direction in the chamber of the housing.

6. The ultrasonic probe assembly according to claim 5, wherein the sensor is positioned in the housing to detect a direction of movement of the carriage.

7. The ultrasonic probe assembly according to claim 1, wherein the catheter sheath has a distal sheath end and the ultrasonic core wire has an engagement end, wherein the engagement end is moveable relative to the distal sheath end.

8. The ultrasonic probe assembly according to claim 7, the ultrasonic probe assembly further comprising a catheter slider connected to the catheter sheath, wherein the catheter slider is configured to move the catheter sheath from a home position wherein the engagement end of the ultrasonic core wire is positioned a first distance from the distal sheath end of the catheter sheath in the crossing mode, and the catheter slider is configured to move the catheter sheath so as to position the engagement end of the ultrasonic core wire a second distance from the distal sheath end of the catheter sheath in the atherectomy mode, the second distance being greater than the first distance.

9. The ultrasonic probe assembly according to claim 1, wherein the ultrasonic transducer is configured to receive an electrical excitation signal from an ultrasonic signal generator.

10. An ultrasonic system, comprising:
    an ultrasonic signal generator; and
    an ultrasonic probe assembly communicatively coupled to the ultrasonic signal generator, the ultrasonic probe assembly including:
    a handle configured to be handheld, the handle including a housing that defines a chamber;
    a carriage slidably coupled to the housing in the chamber, the carriage configured to longitudinally move along the housing between a first position and a second position, the carriage having an operator arm configured to be operable by a user to move the carriage between the first position and the second position;

an ultrasonic catheter having a catheter sheath and an ultrasonic core wire, the ultrasonic catheter having a proximal end portion and a distal end portion; and an ultrasonic transducer positioned in the chamber of the housing, the ultrasonic transducer being connected to the proximal end portion of the ultrasonic catheter, and the ultrasonic transducer being connected to the carriage, wherein:

the ultrasonic transducer is configured to longitudinally move in the chamber of the housing between a retracted position and an extended position coincident with a corresponding longitudinal movement of the carriage;

the ultrasonic catheter is selectively operable in each of a crossing mode and an atherectomy mode;

the ultrasonic probe assembly further comprises a control mechanism configured such that, in the crossing mode, the control mechanism facilitates operation of the ultrasonic transducer when the ultrasonic transducer is moved in either of a proximal direction or a distal direction between the retracted position and the extended position, and in the atherectomy mode, the control mechanism is configured to restrict operation of the ultrasonic transducer if the ultrasonic transducer is moved in the distal direction toward the extended position; and the control mechanism comprises a sensor located in the housing of the handle and a control circuit coupled to the sensor and configured to control the ultrasonic catheter based at least in part on signals received from the sensor.

11. The ultrasonic system according to claim 10, wherein the ultrasonic catheter moves coincident with a longitudinal movement of the ultrasonic transducer.

12. The ultrasonic system according to claim 10, wherein in the crossing mode, the ultrasonic transducer supplies vibratory energy to the ultrasonic core wire at a first ultrasonic energy level, and in the atherectomy mode, the ultrasonic transducer supplies vibratory energy to the ultrasonic core wire at a second ultrasonic energy level greater than the first ultrasonic energy level.

13. The ultrasonic system according to claim 10, wherein:
the handle includes a first button for selecting the crossing mode, and a second button for selecting the atherectomy mode;

the ultrasonic signal generator is communicatively coupled to each of the first button and the second button, the ultrasonic signal generator configured to generate an electrical excitation signal having a first output power when the crossing mode is selected by actuation of the first button, and the electrical excitation signal having a second output power, greater than the first output power, when the atherectomy mode is selected by actuation of the second button, the ultrasonic signal generator being electrically connected to the ultrasonic transducer, the ultrasonic signal generator configured to selectively supply the electrical excitation signal to the ultrasonic transducer;

the sensor is configured to detect a direction of movement of the ultrasonic transducer in the chamber of the housing; and the control circuit is configured to prohibit operation of the ultrasonic signal generator in the atherectomy mode if the sensor detects movement of the ultrasonic transducer in the distal direction in the chamber of the housing.

14. The ultrasonic system according to claim 13, wherein the control circuit is configured to cut off the electrical excitation signal from the ultrasonic transducer if the sensor detects movement of the ultrasonic transducer in the distal direction.

15. The ultrasonic system according to claim 13, wherein the sensor is positioned in the housing to detect a direction of movement of the carriage.

16. The ultrasonic system according to claim 10, wherein the catheter sheath has a distal sheath end and the ultrasonic core wire has an engagement end, the ultrasonic system further comprising a catheter slider connected to the catheter sheath, wherein the catheter slider is configured to move the catheter sheath from a home position wherein the engagement end of the ultrasonic core wire is a first distance from the distal sheath end of the catheter sheath in the crossing mode, and the catheter slider is configured to move the catheter sheath so as to position the engagement end of the ultrasonic core wire a second distance from the distal sheath end of the catheter sheath in the atherectomy mode, the second distance being greater than the first distance.

* * * * *